(12) United States Patent
Jensen et al.

(10) Patent No.: US 10,099,621 B1
(45) Date of Patent: Oct. 16, 2018

(54) ACTIVE TORSIONAL BUCKLING AND LATERAL SHEAR MECHANISM FOR RUNNING BOARD BRACKETS

(71) Applicant: FORD GLOBAL TECHNOLOGIES, LLC, Dearborn, MI (US)

(72) Inventors: John W. Jensen, Canton, MI (US); Mahmoud Yousef Ghannam, Canton, MI (US); Brian Michael Siler, Richmond, MI (US); Satish Chandra Patne, Westland, MI (US)

(73) Assignee: Ford Globel Technologies LLC, Dearborn, MI (US)

( * ) Notice: Subject to any disclaimer, the term of this patent is extended or adjusted under 35 U.S.C. 154(b) by 0 days.

(21) Appl. No.: 15/485,318

(22) Filed: Apr. 12, 2017

(51) Int. Cl.
*B60R 3/02* (2006.01)
*B60R 3/00* (2006.01)
*B60R 19/42* (2006.01)
*B60R 19/34* (2006.01)
*B60R 19/26* (2006.01)

(52) U.S. Cl.
CPC ............. *B60R 3/002* (2013.01); *B60R 19/34* (2013.01); *B60R 19/42* (2013.01); *B60R 2019/262* (2013.01)

(58) Field of Classification Search
CPC .. B60R 3/00; B60R 3/002; B60R 3/02; B60R 3/04; B60R 19/34; B60R 19/26; B60R 19/42; B60R 2019/262

USPC ................... 280/163, 164.1, 164.2, 166, 169
See application file for complete search history.

(56) References Cited

U.S. PATENT DOCUMENTS

| | | | |
|---|---|---|---|
| 5,511,750 | A | 4/1996 | Evenson |
| 5,895,064 | A | 4/1999 | Laubach |
| 6,536,790 | B1 | 3/2003 | Ojanen |
| 7,874,565 | B2 | 1/2011 | Duncan |
| 2003/0006575 | A1* | 1/2003 | Genis ..................... B60R 3/002 280/163 |
| 2007/0228748 | A1 | 10/2007 | Ryan et al. |

FOREIGN PATENT DOCUMENTS

EP          1870290 A1     12/2007

* cited by examiner

*Primary Examiner* — John D Walters
(74) *Attorney, Agent, or Firm* — Jason Rogers; King & Schickli PLLC

(57) ABSTRACT

A bracket adapted to attach a running board to a rocker of a vehicle includes a body having a plurality of running board deflection-inducing portions. The body may include a torsional buckling-inducing portion comprising a rocker mounting portion defining an included angle to a vehicle y-axis and to a vehicle x-axis when mounted to the rocker. The body may further include a rotational moment-inducing portion comprising a stepped segment interposed between the rocker mounting portion and a running board-carrying portion. The rotational moment-inducing portion may further include a rocker mounting tab disposed adjacent to the stepped segment and a flange disposed at an interface of the stepped segment and the running board-carrying portion.

15 Claims, 4 Drawing Sheets

ACTIVE TORSIONAL BUCKLING AND LATERAL SHEAR MECHANISM FOR RUNNING BOARD BRACKETS

TECHNICAL FIELD

This disclosure relates generally to running boards for motor vehicles. In particular, the disclosure relates to a running board mounting bracket providing a controlled running board deflection in the event of a lateral impact load.

BACKGROUND

Vehicle running boards provide great convenience to users, particularly operators of large trucks, sport-utility vehicles, and similar vehicles having an enhanced ground clearance. Running boards also enhance the aesthetic appearance of vehicles so equipped.

However, addition of original equipment and aftermarket running boards to a vehicle presents design and engineering challenges. This is because different running board designs may require different longitudinal support structures (solid plates, hollow tubes, extrusions, other open or closed sectional members), may be fabricated of different materials having different weights, different impact resistance, etc. (for example, fiberglass, steel, aluminum, or composites). Further, Still more, different running board designs may require different, often bespoke mounting methods/devices, for example vehicle body structure brackets, brakes, more advanced systems such as spring-latching systems, and the like. As a result, different running board designs can differently affect vehicle safety performance, i.e. side impact performance.

For this reason, addition of running boards to a vehicle often requires significant additional testing and recalibration of side impact systems, for example systems including side impact sensors. Such recalibration efforts add time and manufacturing cost, necessitating generation of significant additional vehicle-level crash data to support a new side impact recalibration process when a new running board design is implemented.

To solve this and other problems, the present disclosure relates to a running board mounting bracket and associated assemblies and methods. Advantageously, the described mounting bracket is applicable to multiple running board designs and manufactures, but obviates the need for recalibrating side impact safety parameters/devices on changing between running board designs. Thus, a single bracket may be used to mount multiple different running board designs to a vehicle, all without requiring recalibration of the vehicle side impact systems.

SUMMARY

In accordance with the purposes and benefits described herein, in one aspect of the present disclosure a bracket adapted to attach a running board to a rocker of a vehicle is provided, comprising a body having a plurality of running board deflection-inducing portions. In embodiments, the body includes a torsional buckling-inducing portion comprising a rocker mounting portion defining an included angle to a vehicle y-axis and to a vehicle x-axis when mounted to the rocker. In other embodiments, the body further includes a rotational moment-inducing portion comprising a stepped segment interposed between the rocker mounting portion and a running board-carrying portion.

The rotational moment-inducing portion may further include a rocker mounting tab disposed adjacent to the stepped segment. The rotational moment-inducing portion may also include a flange disposed at an interface of the stepped segment and the running board-carrying portion.

In other aspects, a running board assembly for a vehicle is provided, comprising at least one bracket as described above adapted to attach to a rocker of a vehicle, and a running board mounted to the vehicle by the at least one bracket.

In still other aspects, methods for attaching a running board to a rocker of a vehicle are described, comprising attaching a running board to the rocker by a mounting bracket having a plurality of running board deflection-inducing portions. The mounting bracket may include a bracket body substantially as described above, including a torsional buckling-inducing portion comprising a rocker mounting portion defining an included angle to a vehicle y-axis and to a vehicle x-axis when mounted to the rocker and a rotational moment-inducing portion comprising a stepped segment interposed between the rocker mounting portion and a running board-carrying portion.

In the following description, there are shown and described embodiments of the disclosed running board mounting bracket and associated assemblies and methods. As it should be realized, the devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed running board mounting bracket and associated assemblies and methods, and together with the description serve to explain certain principles thereof. In the drawings.

Reference will now be made in detail to embodiments of the disclosed running board mounting bracket and associated assemblies and methods, examples of which are illustrated in the accompanying drawing figures.

DETAILED DESCRIPTION

Conventional mounting brackets for running boards, when mounted to a vehicle rocker, define a plane that is substantially perpendicular to the rocker structure (i.e. the vehicle x-axis). On receipt of a lateral impact load to the running board, the conventional mounting bracket tends to transmit the energy of impact directly into the vehicle side structure, with attendant effects on vehicle side impact systems necessitating extensive recalibration.

Figure 1A:
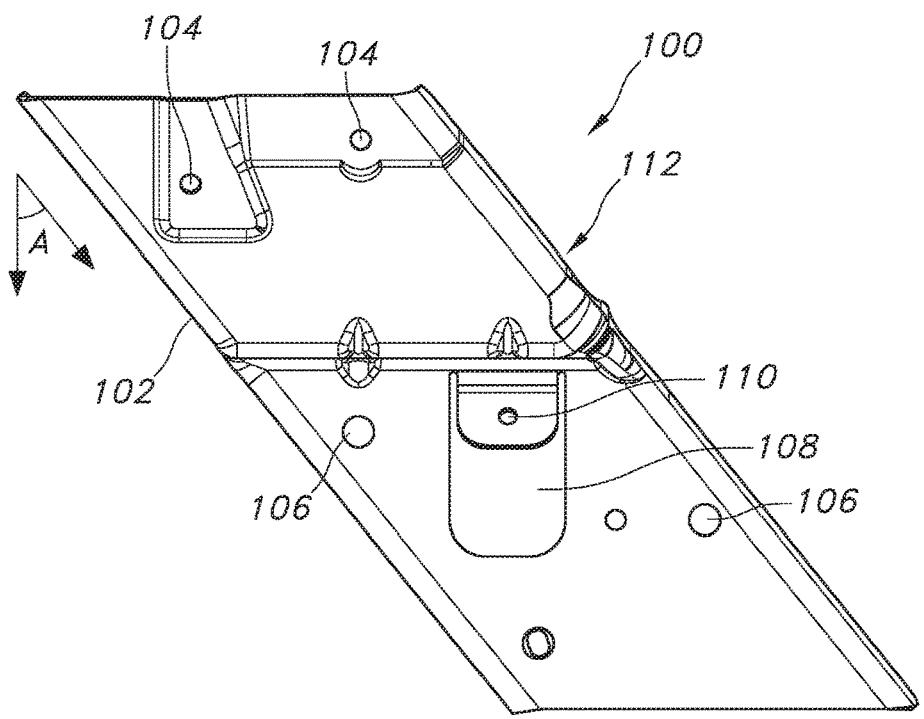
FIG. 1A shows a top view of a running board mounting bracket according to the present disclosure.
Figure 1B:
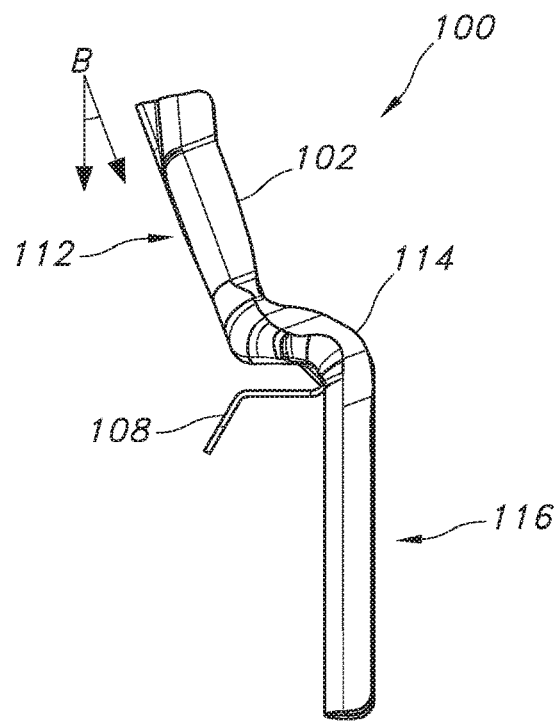
FIG. 1B shows a rear view of the running board mounting bracket of FIG. 1A.
Figure 1C:
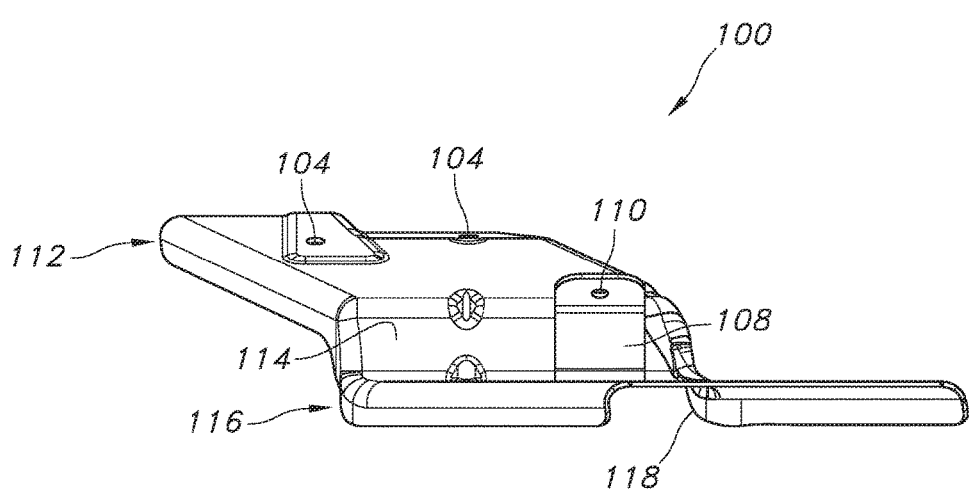
FIG. 1C shows a left side view of the running board mounting bracket of FIG. 1A.

With reference to FIGS. 1A-C, a mounting bracket 100 according to the present disclosure for attaching a running board (not shown) to a rocker (not shown) of a vehicle (not shown) is provided. The mounting bracket 100 includes a body 102 having a variety of running board deflection-inducing portions as will be described. The body 102 includes a plurality of rocker mounting points 104 defined by apertures. Likewise, the body 102 includes a plurality of running board mounting points 106 defined by apertures. As shown and as will be described below, the body 102 when mounted to a vehicle rocker (not shown) defines an included angle A relative to a plane defined by the rocker (the vehicle x-axis), i.e. is not perpendicular to the rocker plane when mounted to the rocker. The body may also include a shear tab 108 including a rocker mounting point 110 defined by an aperture, the purpose of which will be described below.

With reference to FIG. 1B, the body 102 further includes an upper portion 112 defining an included angle B relative to a plane defined by the rocker (not shown). The body 102 further may include a stepped portion 114. As shown, the shear tab 108 is disposed on the body 102 substantially adjacent to a bottom portion of the stepped portion 114. The body further includes a running board mounting portion 116 which supports a running board (not shown) attached thereto. As shown in FIG. 1C, the body 102 may further include a flange 118.

Figure 2:
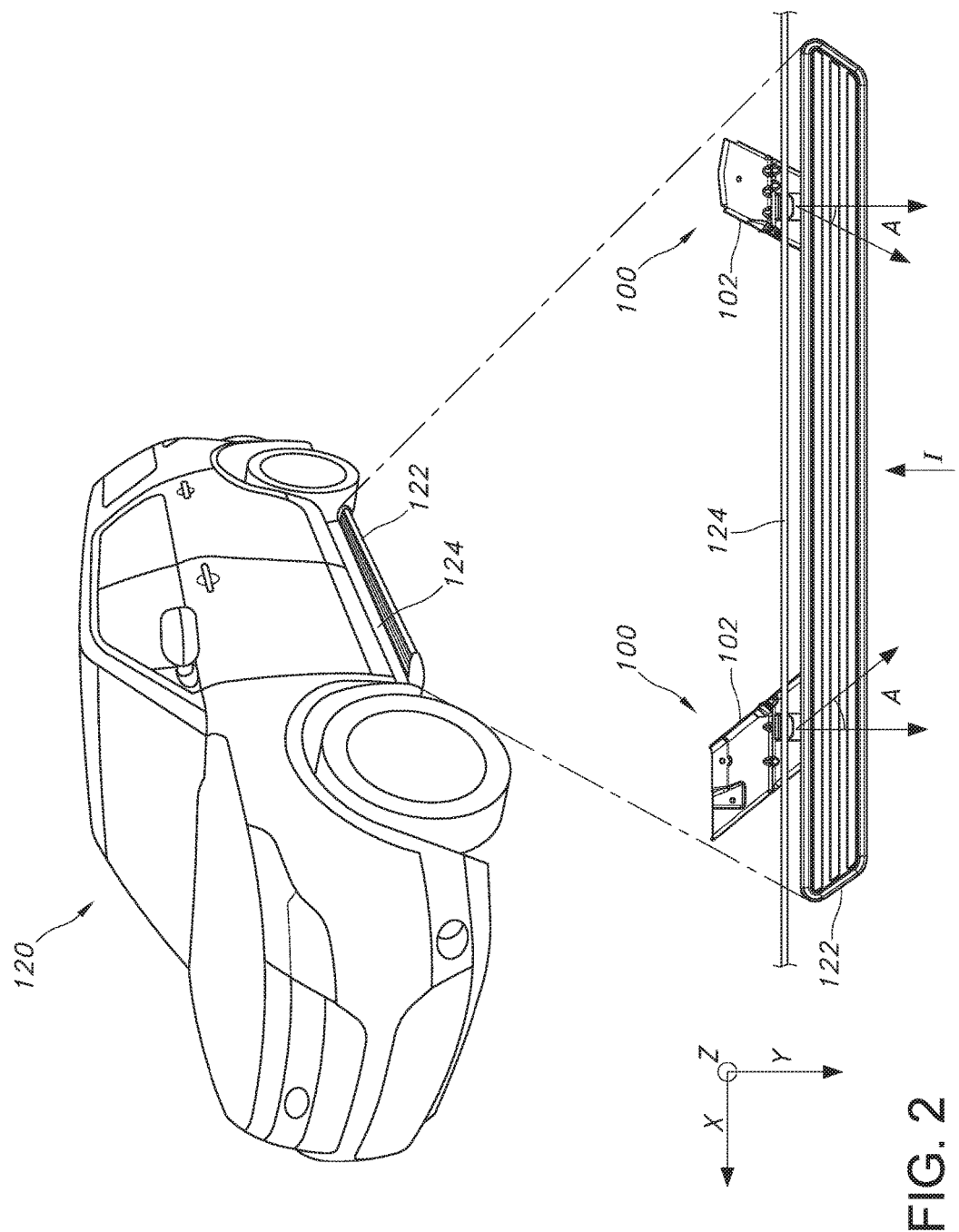
FIG. 2 shows a vehicle having a running board mounted to a left-side rocker by the mounting bracket of FIG. 1A.

FIG. 2 shows a vehicle 120 having a running board 122 mounted to a left-side rocker 124 by mounting brackets 100 as described above. As shown, the mounting brackets 100 carry the running board 122 in a plane substantially parallel to the vehicle x-axis. On the other hand, the bracket body 102 when mounted to the vehicle 120 defines a plane held at an included angle A relative to the vehicle x-axis. Likewise, as described above the rocker mounting portion 112 defines an included angle relative to the vehicle y-axis when mounted to the rocker 124.

Figure 3:
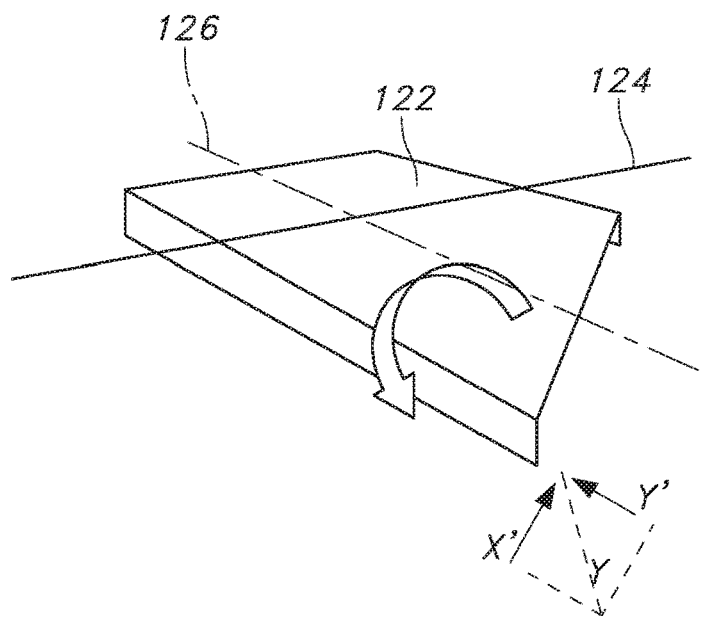
FIG. 3 shows a torsional buckling of a running board on receipt of a lateral impact, imposed by the mounting bracket of FIG. 1A.

Prior to a lateral impact load, vertical (vehicle z-axis) structural support is retained for the running board 122. The mounting brackets 100 held at an included angle A relative to the vehicle x-axis induce a torsional buckling of the running board 122 on receipt of a lateral impact load I, inducing a structural transformation to the bracket 100. Because the mounting bracket angle A is not parallel to the impact load I load path and includes upper portion 112 defining an included angle B relative to a plane defined by the rocker 124, i.e. is not perpendicular to the rocker and the vehicle 100 y-axis, this causes the running board 122 to rotate under the vehicle 100 body structure on receipt of such an impact (see FIG. 3 arrow showing torsional buckling of a running board 122 about a neutral axis 126). This torsional buckling is a reaction to the imposed longitudinal loading X'.

Advantageously, by this torsional buckling, energy absorption by vehicle 100 structures is minimal during a lateral impact. In effect, the energy contribution of the running board 122 compared to that of the vehicle 100 side structure invokes a negligible impact signature (i.e., pressure sensing-volume change control or acceleration sensing (G-force)). Once the structural integrity of the mounting bracket 100 has been compromised, the energy required to move the running board 122 laterally is insignificant. Because of this minimal energy absorption, vehicle 100 impact sensor (not shown) readings are minor and do not impact prior calibration inputs. After such a lateral impact I, only computer-aided engineering (CAE) or physical validation testing is required, rather than a full recalibration of the vehicle 100 side impact systems.

Figure 4:
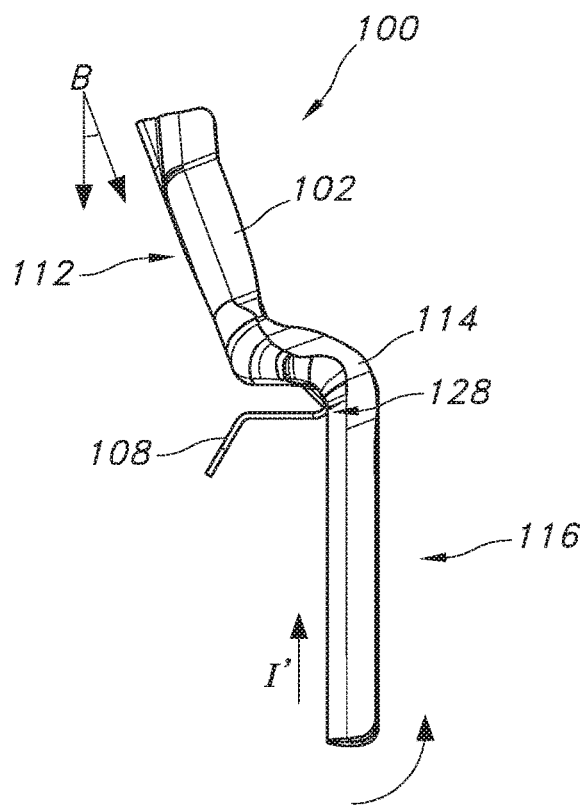
FIG. 4 shows a rotational moment to a running board on receipt of a higher-energy lateral impact, imposed by the mounting bracket of FIG. 1A.

As described above in discussing FIG. 1B, the mounting bracket 100 further includes an upper portion 112 defining an included angle B relative to a plane defined by the rocker, a stepped portion 114, a shear tab 108 which assists in mounting the bracket to a vehicle rocker 124, and a flange 118 (not visible in this view, but see FIG. 1C) disposed on a running board mounting portion 116. On receipt of a higher energy lateral impact load I' (see FIG. 4), the combination of increased stability/strength provided to the upper portion 112 by the rocker mounting points 104, 110 and the decreased structural stability provided by the stepped feature 114 and the flange 118 create a shear point 128 in the bracket body 102. The stepped features 114 induces a bending moment to the mounting bracket 100 on receipt of a sufficiently high energy lateral impact I'. The flange 118 height may be tailored to allow design control to the bracket 100 plastic deformation, dampening the structural process of the brackets under lateral loading. When the flange 118 stiffness is overcome, the running board 122 will rotate under the vehicle 100 body structure as described. Thus, a sufficiently high lateral impact load I' will induce mounting bracket 100 shearing at that shear point 128, causing the running board 122 to rotate under the vehicle 100 body structure rather than being driven laterally into the vehicle body structure.

That is, the stepped feature 114 induces a rotational moment (see arrow) about the mounting bracket 100 longitudinal axis. This rotational or bending moment induces a tear in the material of the mounting bracket 100 at the shear point 128. Again, by this induced rotational moment energy absorption is minimized during even a higher energy lateral impact I', vehicle 100 impact sensor readings are minor, and prior sensor calibration results carry over, with only CAE or physical validation testing being necessitated.

As will be appreciated, on receiving a side impact load the above-described running board deflection-inducing portions create a controlled deflection of a running board 122 rather than the lateral movement encountered in conventional mounting bracket designs. By this controlled deflection, structural integrity of the mounting bracket 100 is altered in a controlled fashion on receipt of a side impact load, without impacting vertical loading integrity of the bracket or of a running board mounted to the bracket. In turn, by the controlled deflection lateral energy contributions of the running board 122 during a side impact load are dissipated, reducing intrusion of the running board into a vehicle 100 side. Because such intrusion is reduced, the need for recalibration of side impact safety systems on changing running board designs is lessened, since regardless of design intrusion of the running board 122 into the vehicle 100 side on side impact will be lessened. Stated differently, the energy signature of the running board mounted by the described mounting bracket, on receiving a side impact load, is rendered negligible compared to the energy signature of a running board mounted by a mounting bracket lacking the described deflection-inducing portions.

Obvious modifications and variations are possible in light of the above teachings. For example, the above-described torsional buckling and rotational moment effects may be increased/decreased by controlling other factors such as bracket 100 material thickness at shear point 128 or elsewhere, flange 118 height, etc. All such modifications and variations are within the scope of the appended claims when interpreted in accordance with the breadth to which they are fairly, legally and equitably entitled.

What is claimed:

1. A bracket adapted to attach a running board to a vehicle rocker, comprising a body having a plurality of running board deflection-inducing portions, the plurality including at least a torsional buckling-inducing portion comprising a rocker mounting portion defining an included angle to a vehicle y-axis and to a vehicle x-axis when mounted to the rocker.

2. The bracket of claim 1, wherein the body further includes a rotational moment-inducing portion comprising a stepped segment interposed between the rocker mounting portion and a running board-carrying portion.

3. The bracket of claim 2, wherein the rotational moment-inducing portion further includes a rocker mounting tab disposed adjacent to the stepped segment.

4. The bracket of claim 3, wherein the rotational moment-inducing portion further includes a flange disposed at an interface of the stepped segment and the running board-carrying portion.

5. A running board assembly comprising the bracket of claim 1.

6. A vehicle comprising the running board assembly of claim 5.

7. A running board assembly for a vehicle, comprising:
at least one bracket adapted to attach to a vehicle rocker, comprising a bracket body having a plurality of running board deflection-inducing portions including at least a torsional buckling-inducing portion comprising a rocker mounting portion defining an included angle to a vehicle y-axis and to a vehicle x-axis when mounted to the rocker; and
a running board mounted to the vehicle by the at least one bracket.

8. The running board assembly of claim 7, wherein the bracket body further includes a rotational moment-inducing portion comprising a stepped segment interposed between the rocker mounting portion and a running board-carrying portion.

9. The running board assembly of claim 8, wherein the rotational moment-inducing portion further includes a rocker mounting tab disposed adjacent to the stepped segment.

10. The running board assembly of claim 9, wherein the rotational moment-inducing portion further includes a flange disposed at an interface of the stepped segment and the running board-carrying portion.

11. A vehicle comprising the running board assembly of claim 7.

12. A method for attaching a running board to a rocker of a vehicle, comprising attaching a running board to the rocker by a mounting bracket having a plurality of running board deflection-inducing portions including at least a torsional buckling-inducing portion comprising a rocker mounting portion defining an included angle to a vehicle y-axis and to a vehicle x-axis when mounted to the rocker.

13. The method of claim 12, including providing the bracket body further having a rotational moment-inducing portion comprising a stepped segment interposed between the rocker mounting portion and a running board-carrying portion.

14. The method of claim 13, further including disposing a rocker mounting tab adjacent to the stepped segment.

15. The method of claim 13, further including weakening a segment of the bracket body by disposing a flange at an interface of the stepped segment and the running board-carrying portion.

* * * * *